May 16, 1967    M. MAXWELL    3,319,828
WEIGHT RATE CONTROL

Filed Oct. 28, 1964    5 Sheets-Sheet 1

INVENTOR
MILTON MAXWELL

BY Strauch, Nolan & Neale
ATTORNEYS

May 16, 1967 M. MAXWELL 3,319,828
WEIGHT RATE CONTROL
Filed Oct. 28, 1964 5 Sheets-Sheet 3

INVENTOR
MILTON MAXWELL

BY Strauch, Nolan & Neale
ATTORNEYS

May 16, 1967   M. MAXWELL   3,319,828
WEIGHT RATE CONTROL
Filed Oct. 28, 1964   5 Sheets-Sheet 4

INVENTOR
MILTON MAXWELL
BY Strauch, Nolan & Neale
ATTORNEYS

May 16, 1967

M. MAXWELL 3,319,828

WEIGHT RATE CONTROL

Filed Oct. 28, 1964

INVENTOR

MILTON MAXWELL

BY Strauch, Nolan & Neale

ATTORNEYS

United States Patent Office 3,319,828
Patented May 16, 1967

3,319,828
WEIGHT RATE CONTROL
Milton Maxwell, Newark, N.J., assignor to Colgate-Palmolive Company, New York, N.Y., a corporation of Delaware
Filed Oct. 28, 1964, Ser. No. 406,997
19 Claims. (Cl. 222—1)

This invention relates to methods and apparatus for measuring and controlling the weight rate of flow of fluent material.

More particularly the invention relates to methods and apparatus for controlling the rate of flow of a fluent material in units of weight per unit of time, as for accurately maintaining a continuous flow of fluent materials from a supply source to a process where the material is utilized or treated.

In its preferred embodiment the invention will be described as applied to a system employing a so-called intermittent receptable and a continuous receptacle, with maintained series connections between the receptacles and to a source of supply and the process for using the material: in combination with means for continuously weighing the contents of the continuous receptacle, means for continuously weighing the combined contents of both receptacles and translating this into control signals in terms of instantaneous rate of change of weight independent of the actual weight itself, together with means for providing a continuous predetermined rate of change command signal independent of the time reference and comparing it with one or both of the foregoing instantaneous rate of change of weight signals and reducing to zero the differences between those signals being compared to control discharge of the fluent material from the continuous receptacle.

It is therefore the major object of this invention to provide a novel method and apparatus for measuring and/or controlling, continuously and automatically, the weight rate of flow of a fluent material.

Another object of the invention is to provide novel methods and apparatus for controlling the rate of flow of a fluent material for accurately maintaining a continuous supply of fluent material from a source to a process where the material is utilized or treated.

It is a further object of the invention to provide a novel apparatus for controlling flow of fluent material comprising a system employing a so-called intermittent receptacle and a continuous receptacle, with maintained series connections between the receptacles and to a source of supply and the process for using the material; in combination with means for continuously weighing the contents of the continuous receptacle, means for continuously weighing the combined contents of both and translating this into control signals in terms of instantaneous rate of change of weight independent of the actual weight itself, together with means for providing a continuous predetermined rate of change command signal independent of the time reference and comparing it with one or both of the foregoing instantaneous rate of change of weight signals and reducing to zero the differences between those signals being compared to control discharge of the fluent material from the continuous receptacle.

It is a further object of the invention to provide a novel system of associated receptacles and weighing devices combined to meter a continuous stream of fluent material between a supply source and a process wherein control of said stream is responsive to measurements of material flow in units of weight per unit of time independent of the total weight of material in the receptacles during operation.

Another object of the invention is to provide a novel structural association of receptacles, weighing apparatus and material feed controls for weight rate control of flow of fluent material between a source and a point of use.

Further objects of the invention will appear as the description proceeds in connection with the appended claims and the annexed drawings wherein:

FIGURE 5 shows a combination apparatus utilizing the invention; and

Figure 1:
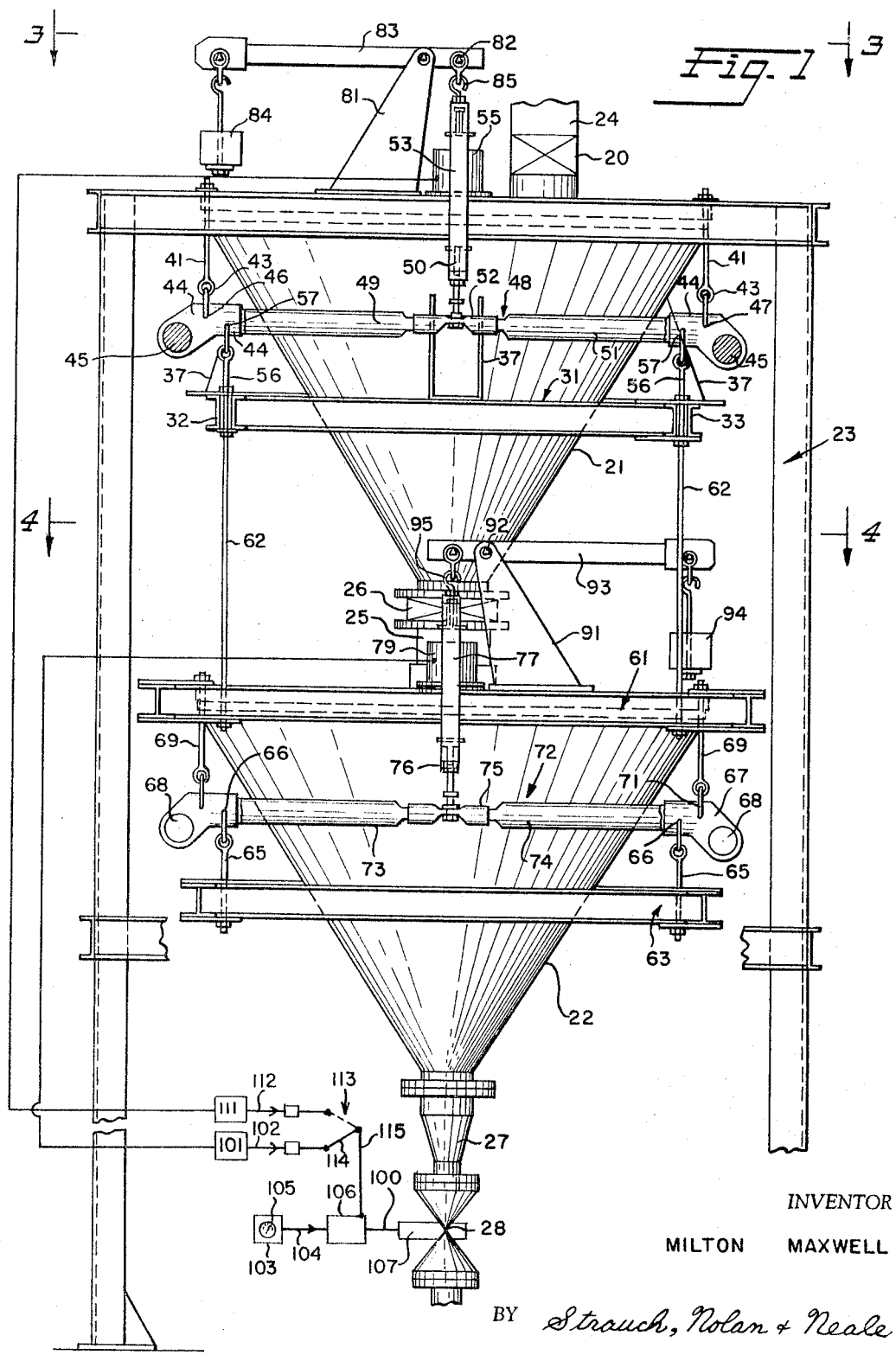
FIGURE 1 is a front elevation showing an apparatus according to a preferred embodiment of the invention, and wherein the method of the invention may be carried out.

The system of the invention in its preferred embodiment comprises two vertically aligned material receiving tanks or like receptacles 21 and 22 that are preferably of about the same size and are mounted in cooperative relation upon a stationary support 23.

Upper receptacle 21 is of generally conical shape with an inlet conduit 24 constantly connected to supply fluent material through its normally covered larger upper end. A supply valve 20 is provided in conduit 24. The lower end of upper receptacle 21 is connected to discharge into a conduit 25 through a transfer valve 26. Conduit 25 enters the upper end of lower receptacle 22 and discharge from the lower end of the lower receptacle 22 is effected through a conduit 27 controlled by an adjustable orifice flow metering valve 28. Conduit 25 is either longitudinally flexible or longitudinally slidably associated with the cover of receptacle 22 to permit relative movement as will appear.

A rectangular horizontal mounting frame 31 comprises two parallel side bars 32 and 33 connected at opposite ends by shorter parallel side bars 34 and 35. A short bar 36 parallel to bars 34 and 35 extends rigidly across the frame, so that a rigid square enclosure portion of the frame encompasses the receptacle 21 and is secured thereto as by welding or bolting directly to receptacle side brackets 37.

A plurality of hangers 41 extend down from upper support braces 42. These hangers at their lower ends are pivotally connected at 43 to short arms 44 rigid with spaced parallel scale beam operating rods 45, so that the supporting pivot axes 46 and 47 at each side of the support are located inwardly of rods 45.

At one pair of adjacent ends, rods 45 are interconnected by a scale beam assembly 48 comprising two beams 49 and 51 rigid with the respective rods and extending toward each other into independent separable slidably fit with a coupling assembly 52 pivotally connected at 50 to the lower end of a load cell loading member 53 having an upper bridge 54 supported on a load cell 55 of a suitable type that is mounted upon the upper part of support 23. For example load cell 55 may be of the electrical strain gauge type with its output amplified.

Figure 2:
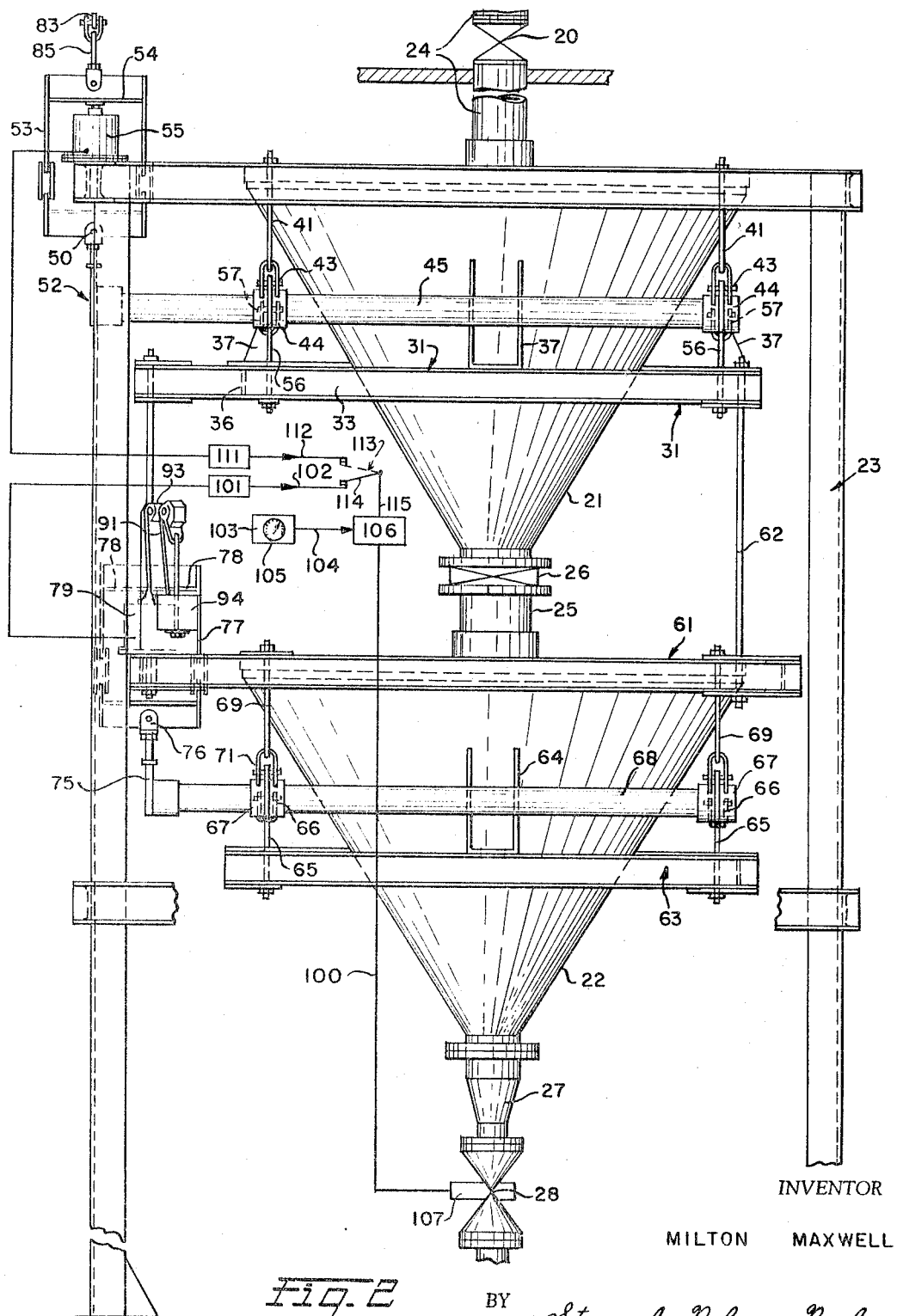
FIGURE 2 is a side elevation of the apparatus of FIGURE 1, additionally diagrammatically showing the valve control arrangements.
Figure 3:
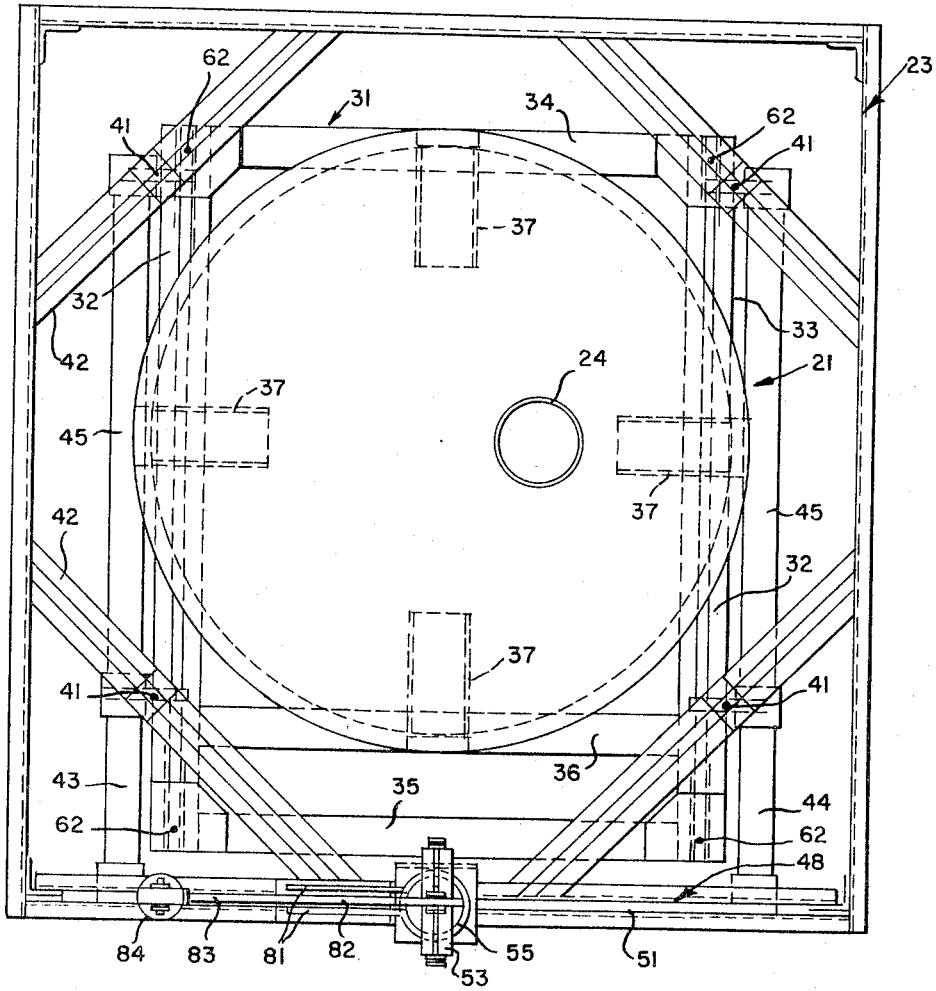
FIGURE 3 is a section substantially on line 3—3 of FIGURE 1.
Figure 4:
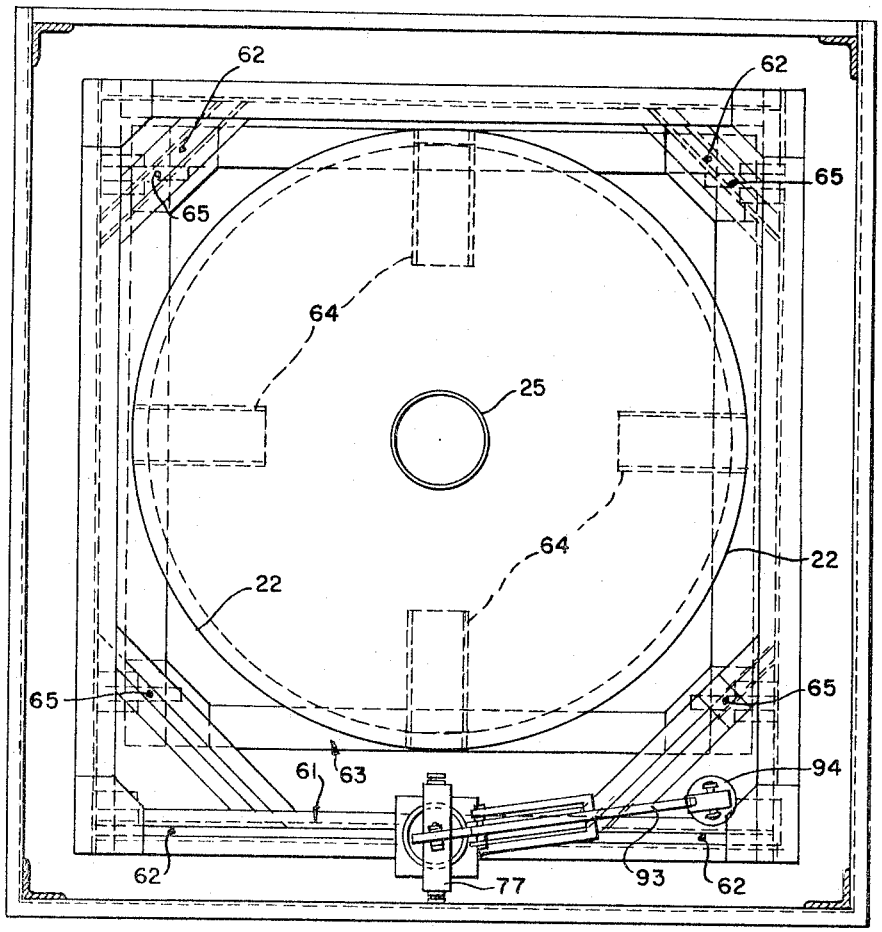
FIGURE 4 is a section substantially on line 4—4 of FIGURE 1.

Referring to FIGURE 2, hangers 56 extend downwardly from pivotal connections 57 with the rod arms 44 to be rigidly secured to frame 31.

A rectangular horizontal frame 61 is rigidly suspended from frame 31 at the level of the top of lower receptacle 22, as by vertical hangers 62. A horizontal square enclosure mounting frame 63 is rigidly secured to lower receptacle 22 as by welding or bolting to brackets 64 on the receptacle. Frame 63 is rigid with the lower ends of four corner hangers 65 having their upper ends pivoted at 66 to short arms 67 rigid with parallel horizontal scale beam operating rods 68. Four corner hangers 69 rigid with frame 61 are pivoted at 71 at their lower ends to arms 67.

At a pair of adjacent ends, rods 68 are interconnected by a scale beam assembly 72 similar to that at 48, wherein opposite beams 73 and 74 rigid with the respective rods 68 are separably slidably connected to a coupling 75. Coupling 75 is pivotally connected at 76 to the lower end of a load cell loading member 77 having its upper bridge 78 resting upon the load cell 79 carried by frame 61.

Thus lower receptacle 22 is directly suspended from upper receptacle 21, and load cell 79 measures the weight of lower receptacle 22 and its contents, while load cell 55 measures the combined weights of both receptacles and their contents, for a purpose to appear.

Referring to FIGURES 1 and 2, an upstanding bracket 81 on the top of support 23 has intermediately pivotally mounted thereon at 82 a tare weight beam 83. A weight 84 is suspended from one end of beam 83, and the other end of beam 83 is pivotally connected at 85 to the load cell member 53. By selection or adjustment of the weight at 84 the load cell at 55 may be unloaded to compensate for the tare weight of the entire assembly of receptacles 21 and 22.

Similarly a rigid bracket 91 upstands from frame 61 to intermediately pivot at 92 a tare weight beam 93. A weight 94 is suspended from one end of beam 93, and the other end of the beam is pivoted at 95 to the load cell member 77. By selection or adjustment of the weight at 94 the load cell 79 may be unloaded to compensate the tare weight of the lower receptacle 22.

For purposes of understanding the operation the upper receptacle 21 will be referred to as the intermittent receptacle, and the lower receptacle 22 will be referred to as the continuous receptacle.

In operation, with the tare adjustments properly made, it may be customary to start with the lower continuous receptacle 22 full of the fluent material and the upper intermittent receptacle 21 empty. The weight of the contents of receptacle 22 is continuously measured at load cell 79.

Now discharge of the fluent material into the process to be provided with the fluent material under control is started by opening flow metering valve 28 so that the material starts gradually flowing continuously through conduit 27 at a constant predetermined rate, such as a certain number of pounds per hour, under control of the system as will appear.

The reducing weight of the contents of receptacle 22 is being continuously measured by load cell 79 which is connected into a circuit designated at 101 that provides on lead 102 an electrical output signal potential that is a function of the instantaneous rate of change of weight of the contents of receptacle 22. The value of this signal is thus independent of the amount of weight itself.

The control section of the system of the invention includes a separately energized command signal generator 103 that produces on lead 104 an electrical signal potential which may be adjusted as at 105 to produce signals of different potential corresponding to those representing different rates of change of weight of the contents of receptacle 22. The adjustment at 105 is calibrated to the rate of flow through valve 28.

The command and measured signal potentials on leads 102 and 104 are compared, as in a potentiometer arrangement within a self balancing comparator designated at 106, and the output of comparator 106 is connected by lead 100 to a servo motor device 107 which is connected to vary the size of the flow orifice in valve 28 when actuated.

Thus, depending upon the setting at 105, the fluent material from lower receptacle 22 starts discharging through conduit 27 at a controlled predetermined rate, representing a controlled rate of change of weight of the contents of lower continuous receptacle 22.

Now the upper receptacle 21 is quickly filled with fluent material by opening supply valve 20, and valve 20 is closed to cut off the supply when the receptacle 21 is filled to a predetermined level. Receptacle 21 preferably contains at least enough material to quickly fill receptacle 22 as will appear.

The lower receptacle 22 continues discharging material at the controlled rate, and after the valve 20 is closed the weight of the combined contents of both receptacles 21 and 22 is then continuously measured by load cell 55 which is connected into a circuit 111 that produces on lead 112 an electrical output signal potential that is a function of the instantaneous rate of change of weight of the contents of the combined receptacles 21 and 22.

This instantaneous rate of change of weight of the combined receptacles is of course the same as the instantaneous rate of change of weight of receptacle 22 alone, since only receptacle 22 is continuing to discharge at exactly the same controlled rate of a certain number of weight units per unit of time, so that the measured signal potential on lead 112 equals that on lead 102.

Now the switching device 113 is automatically operated to quickly substitute the measured signal potential of lead 112 for that of 102 at the comparator 106, so that the comparator is comparing the measured signal potential corresponding to change in weight of the combined receptacles to the command signal of generator 103 to control the orifice of metering valve 28 and therefore the rate of discharge of the fluent material into the process. Switch element 114 has turned to the dotted line condition of FIGURE 2 where it connects lead 112 to comparator lead 115.

Now the transfer valve 26 is operated to quickly discharge the contents of upper receptacle 21 into lower receptacle 22, and transfer valve 26 is closed when receptacle 22 has been refilled to a desired level. This does not change the controlled rate of change of the weight of the fluent material, and control of the orifice of flow metering valve 28 and hence the weight rate of discharge of the fluent material is continuously maintained.

Now the switching device 113 is automatically reversed to the full line position of FIGURE 2 wherein the lead 102 is again connected to the comparator, and the cell 79 supplies the measured weight control as at the start. At this time the upper intermittent receptacle can again be refilled quickly without affecting the weight rate control of discharge of the contents of lower receptacle 22, and the foregoing cycle of operation repeated as long as desired.

The invention contemplates any suitable automatic sequential control of valves 20 and 26 and switching device 113 in accord with the foregoing operation whereby the supply valve 20 is automatically opened only when transfer valve 26 is closed and the measured signal derived from cell 79 is being compared at the comparator 106, and the transfer valve 26 is automatically opened only when supply valve 20 is closed and control is under the measured signal as derived from cell 55.

The invention therefore provides a system wherein fluent material is discharged continuously from receptacle 22 at a controlled rate, and the contents of receptacle 22 are automatically replenished while maintaining the same rate of continuous flow and the same control of the rate of flow. There is thus a continuous flow of the fluent material out of the entire two receptacle system at a controlled rate in units of weight per unit of time, from a source of supply to a process or like point of use of treatment of the material.

FIGURE 5 illustrates the invention in the combination wherein the material discharged from receptacle 22 is discharged into a mixing hopper 120. Thus the arrangement of receptacles 21 and 22 and the weight rate controls described as for FIGURES 1–4 are duplicated at the left side of FIGURE 5 wherein corresponding elements are diagrammatically shown and similarly numbered.

At the right side of FIGURE 5, the upper receptacle 121 is similar to receptacle 21 and similarly mounted. A frame 122 secured to receptacle 121 is suspended by hangers 123 from the scale beam assembly 124 which in turn is suspended as by hangers 125 from support 130. The scale beam assembly 124 is connected to load member 126 for load cell 127 mounted on support 130, and the pivoted tare beam 128 is attached to member 126.

A discharge conduit 129 from the bottom of receptacle 121 contains a transfer valve 131 and enters a receptacle 132 secured upon support frame 133 which is suspended from the scale beam assembly 134 as by hangers 135. Assembly 134 in turn is suspended by hangers 136 from a frame 137 that is suspended by hangers 138 from frame 122. A load cell 139 is mounted on frame 137 and connected by load member 141 to the scale beam assembly 134. A pivoted tare beam 142 is connected to the load member 141. These scale beam, hanger, load cell and load member arrangements are similar to those in FIGURES 1–4 and need not be described in more detail.

Receptacle 132 is of the type having a vibrating bottom portion and discharges through conduit 143 into a screw feeder tube unit 144 wherein the screw 145 is driven by a motor 146 to provide controlled discharge of the fluent material from receptacle 132 into mixing hopper 120 where the fluent material from receptacle 22 is admixed therewith. Feeder 144 thus acts like valve 28 to effect controlled discharge of the fluent material to the point of use at 120.

The weight of the contents of receptacle 132 is continuously measured at load cell 139, and the weight of the combined contents of receptacles 132 and 121 is continuously measured at load cell 127. The outputs of these load cells are connected into the same type of circuit as at the other side which functions to control the speed of motor 146 to control the continuous feed of fluent material to the hopper 120.

In the circuit shown at the right side of FIGURE 5 connected to load cells 127 and 139 similar components are indicated by the same numerals with prime marks.

In operation material from a source may enter upper receptacle 121 through a conduit 150 controlled by a supply valve 151. Starting with valves 151 and 131 closed and receptacle 132 being discharged continuously through feeder 144, the load cell 139 continuously measures changing weight of receptacle 132 and is connected into circuit 101' that provides on lead 102' an electrical output signal potential that is a function of the instantaneous rate of change of the weight of the contents of receptacle 132. This signal, with switch 114' in the full line position, is compared in comparator 106' with the command signal from signal generator 103' which is adjustable at 105', and the output thereof is connected to control the speed of motor 146 and therefore the rate of discharge of the material into hopper 120.

The supply valve 151 is opened to quickly suitably fill the upper receptacle and then closed. After the supply valve is closed the lower receptacle continues to discharge continuously and the weight of the combined contents of both receptacles 121 and 132 is continuously measured at load cell 127 which is connected into circuit 111'. The switching device 114' is now automatically operated to the dotted line position in FIGURE 5 to substitute the measured signal potential of lead 112' for that of lead 102' at comparator 106', so that the comparator is now comparing the measured signal potential corresponding to the change in weight of the combined receptacles to the command signal to control the speed of motor 146.

Now the transfer valve 131 is opened to discharge its contents quickly into receptacle 132. Then the switching device 114' is returned to the full line position of FIGURE 5 where lead 102' is again connected to comparator 106', so that the upper receptacle can be refilled without disturbing the control of motor 146. The cycle can be repeated as often as desired.

It will be seen from the foregoing that two different materials may be continuously supplied in accurately metered flow into a common mixing hopper 120, the controls 103' and 105' enabling the operator to set and correct the supply of either relative to the other. Thus the mixture proportions may be accurately set and maintained at all times, and a correct formulation of two ingredients is maintained even where the demand at the outlet of hopper 120 may be variable.

Figure 6:
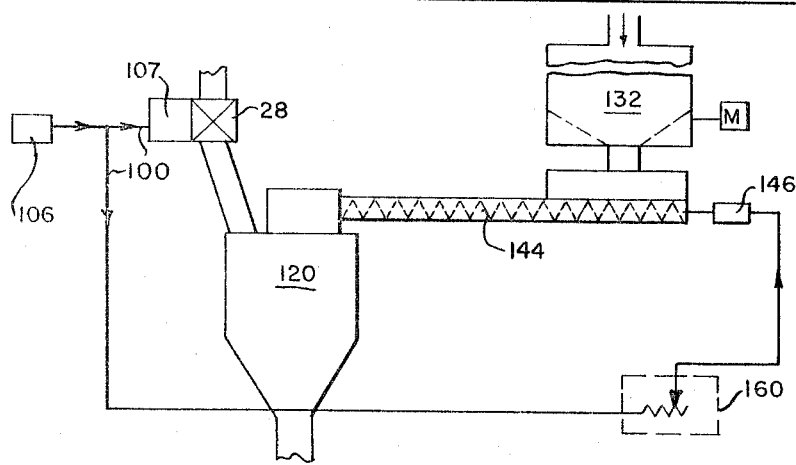
FIGURE 6 shows a further control arrangement for the embodiment of FIGURE 5.
Figure 7:
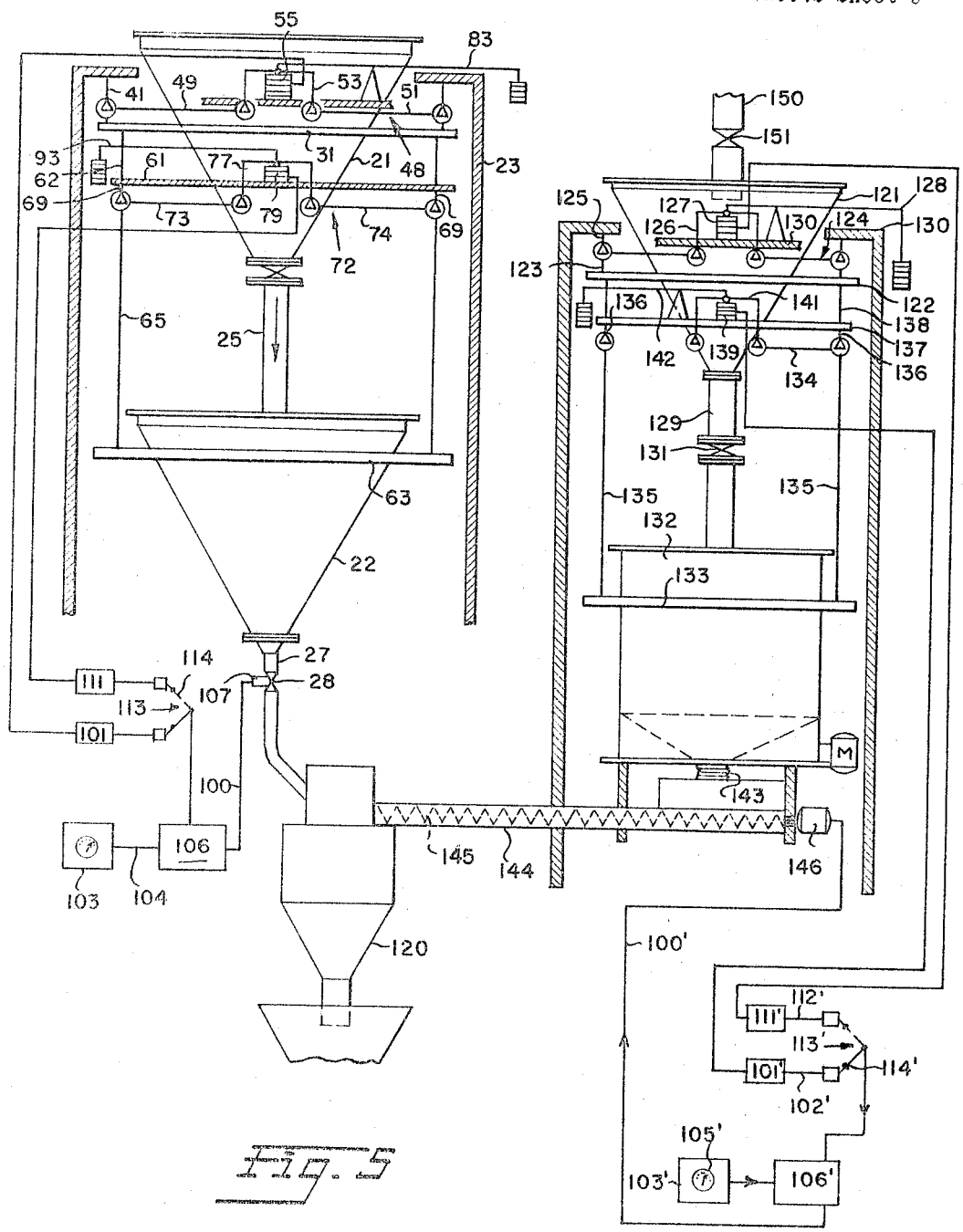

As shown in FIGURE 6 it is also within the scope of one form of the invention to control the speed of feed motor 146 from the signal on lead 100, thereby dispensing with the upper receptacle and the weighing and control arrangements shown at the right side of FIGURE 5. In this embodiment the material would be supplied directly into receptacle 132 and withdrawn therefrom by screw feeder 134 driven by motor 146. The lead 100, which reflects control proportional to the rate of discharge of material from receptacle 22, is suitably connected motor 146 as well as valve 28 so that a desired differential of ingredient flow may be maintained from a single weight responsive control station. Preferably the lead to motor 146 contains a proportioning device diagrammatically shown at 160, whereby the feed differential between the ingredients passed by valve 28 and feeder 134 may be varied for different formulations.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of metering the rate of flow of a fluent material comprising passing said material through two receptacles connected in series, one of said receptacles containing a continuously changing weight of said material, and the other of said receptacles having said material discharged into it periodically, continuously weighing the contents of said one of said receptacles to produce a measured signal corresponding to the rate of change of weight, continuously weighing the combined contents of said receptacles when said other receptacle is not receiving material but while said one receptacle continues to change in weight so as to produce a measured signal of equivalent value corresponding to said rate of change of weight, successively comparing said measured signals to a predetermined command signal, and applying the resultant of said comparison to control the flow rate of said material at said one receptacle.

2. The method defined in claim 1 wherein material is continuously discharged from said one receptacle through a control valve, material is periodically discharged from said other receptacle to said one receptacle to replenish the contents thereof while said combined contents are being weighed, and said resultant is applied to regulate said control valve.

3. A method of metering the rate of flow of a fluent material comprising passing said material through two receptacles in series, continuously discharging said material from one of said receptacles, periodically supplying said material to the other of said receptacles and periodically transferring material from said other receptacle to said one receptacle, continuously weighing the contents of said one receptacle alone during periods when said material is being supplied to said other receptacle and when said material is not being transferred between the receptacles and continuously weighing the combined contents of both receptacles during periods when said other receptacle is not being filled and said material is being transferred between said receptacles to produce similar measured signals, successively comparing said measured signals to a command signal, and applying the resultant of said signal comparison to continuously regulate the discharge of said one receptacle.

4. A method of metering the rate of flow of a fluent material comprising passing said material through two receptacles in series, continuously discharging said material from one of said receptacles, periodically supplying said material to the other of said receptacles and periodically transferring material from said other receptacle to said one receptacle, continuously weighing the contents of said one receptacle alone during periods when said material is being supplied to said other receptacle and when said material is not being transferred between the receptacles and continuously weighing the combined contents of both receptacles during periods when said other receptacle is not being filled and said material is being transferred between said receptacles to produce similar measured signals corresponding to the instantaneous rate of change of weight of said one receptacle and said combined receptacles respectively, successively comparing said measured signals to a command signal, and applying the resultant of said signal comparison to continuously regulate the discharge of said one receptacle.

5. A method of metering the flow of fluent material wherein the material is passed through two receptacles connected in series through a transfer valve and one of said receptacles continuously discharges said material into a process or the like, comprising continuously weighing the contents of said one continuously discharging receptacle with said transfer valve closed to obtain a first measured weight signal and applying said signal to control the rate of discharge of said one receptacle, supplying material into the other receptacle while said transfer valve is closed, continuously weighing the combined contents of said receptacles to obtain a second measured weight signal, transferring control of the rate of continuous discharge of said material to said second measured weight signal and then opening the transfer valve to transfer the contents of said other receptacle to said one receptacle, closing said transfer valve and transferring control of said rate of continuous discharge of said material from said one receptacle back to the first measured weight signal, and repeating the foregoing cycle to maintain continuous control of the rate of discharge of said material to said process or the like.

6. A method of metering the flow of fluent material wherein the material is passed through two receptacles connected in series through a transfer valve and one of said receptacles continuously discharges said material into a process or the like, comprising continuously weighing the contents of said one continuously discharging receptacle with said transfer valve closed to obtain a first measured weight signal corresponding to the instantaneous rate of change in weight of said material at said one receptacle and applying said signal to control discharge of said one receptacle, supplying material into the other receptacle while said transfer valve is closed, continuously weighing the combined contents of said receptacles to obtain a second measured weight signal corresponding to the instantaneous rate of change in weight of said combined contents, transferring control of discharge of said one receptacle to said second measured weight signal and then opening the transfer valve to transfer the contents of said other receptacle to said one receptacle, closing said transfer valve and transferring control of discharge of said material from said one receptacle back to the first measured weight signal, and repeating the foregoing cycle to maintain continuous control of the rate of discharge of said material to said process or the like.

7. The method defined in claim 6 wherein said first and second measured weight signals are cyclically compared to a predetermined command signal and the resultant continuously applied to effect said control of the discharge of said material from said one receptacle.

8. Apparatus for controlling the flow of fluent material in a system wherein the material is passed through two receptacles connected in series through a transfer valve and one said receptacle continuously discharges said material into a process or the like, comprising means for continuously weighing the contents of said one continuously discharging receptacle with said transfer valve closed and obtaining a first measured weight signal corresponding to the instantaneous rate of change in weight of said material at said one receptacle, means for applying said signal to control discharge of said one receptacle, means for supplying fresh material into the other receptacle while said transfer valve is closed, means for continuously weighing the combined contents of said receptacles and obtaining a second measured weight signal corresponding to the instantaneous rate of change in weight of said combined contents, means for transferring control of discharge of said material to said second measured weight signal, means for opening the transfer valve to transfer the contents of said other receptacle to said one receptacle, means for closing said transfer valve and transferring control of discharge of said material back to the first measured weight signal, and means for repeating the foregoing cycle to maintain continuous control of the rate of continuous discharge of said material from the system.

9. In the apparatus defined in claim 8, means providing a settable predetermined command signal, and means whereby said first and measured weight signals are cyclically compared to said command signal and the resultant applied to effect said continuous control of discharge from said one receptacle.

10. In combination, two similar systems as defined in claim 9, wherein the continuously discharging receptacles of each system deliver different ingredient materials to mixing means, and wherein said discharge controls are related to maintain proportional delivery of the different ingredients according to a selected formula.

11. In the apparatus defined in claim 8, a receiver for material discharged from said one receptacle, a third receptacle having means for feeding another material therefrom to said receiver, and means for continuously controlling said feeding means from said measured weight signals to maintain a desired proportional delivery of said materials to said receiver.

12. A system for controlling the flow of fluent material from a supply to a point of use or treatment of said material comprising a first receptacle connected to continuously discharge toward said point of use, flow metering means for regulating said discharge, a second receptacle continuously connected to said supply, supply means for establishing or blocking delivering of material into said second receptacle, means defining a passage between said receptacles, a transfer valve in said passage, first weighing means adapted to continuously measure the weight of the contents of said first receptacle, second weighing means adapted to continuously measure the combined weight of the contents of both receptacles, first control means responsive to the changing weight of the contents of said first receptacle to produce a first measured signal proportional to the change in unit weight per unit time at said first receptacle, second control means responsive to the changing combined weight of the contents of said receptacles to produce a second measured signal proportional to the change in unit weight per unit time of both receptacles, means calibrated to correspond to said measured signals for producing a predetermined command signal, and means for sequentially connecting said first measured signal into association with said commond signal to control said flow metering means, filling said second receptacle, disconnecting said first measured signal and operatively connecting said second measured signal into association with said command signal to shift control of said flow metering means from said first control means to said second control means, opening said transfer valve to transfer the contents of the second receptacle to said first receptacle, and then shifting control of said flow metering means back to said first control means, said flow metering means being continuously controlled by one or the other of said control means.

13. A system for metering the flow of fluent material from a supply to a point of use or treatment of said material comprising a first receptacle connected to continuously discharge toward said point of use, flow metering means for regulating said discharge, a second receptacle connected to said supply, a supply valve for establishing or blocking delivery of material into said second receptacle, means defining a passage between said receptacles, a transfer valve in said passage, first weighing means adapted to continuously measure the weight of the contents of said first receptacle, second weighing means adapted to continuously measure the combined weight of the contents of both receptacles, first control means responsive to the changing weight of contents of said first receptacle operably connected to said flow metering means only while said transfer valve is closed and said first receptacle is discharging, second control means responsive to the changing combined weight of contents of said receptacles operably connected to said flow metering means when said transfer valve is open and the contents of the second receptacle are being transferred to the first receptacle, means operable before said transfer valve is opened to shift control of said flow metering means from said first control means to said second control means, and means operable after said transfer of the contents of the second receptacle to said first receptacle for disabling said operable connection between the second control means and the flow metering means and re-establishing an operable connection between the flow metering means and said first control means.

14. A system for controlling the flow of fluent material from a supply to continuously discharge toward a point of use of said material comprising a first receptacle connected to discharge toward said point, flow metering means for regulating said discharge, a second receptacle having an inlet connected to said supply, a supply valve for establishing or blocking said inlet, a passage between said receptacles, a transfer valve in said passage, first weighing means adapted to continuously measure the weight of the contents of said first receptacle, second weighing means adapted to continuously measure the combined weight of the contents of both receptacles, means responsive to the changing weight of the contents of the first receptacle for producing a first measured signal that is a function of the rate of change of weight of said first receptacle, means responsive to the changing weight of the contents of the combined receptacles for producing a second measured signal that is a function of the rate of change of the combined weights of said receptacles, means independent of said weight responsive means for producing a predetermined command signal corresponding to a desired weight rate of discharge from said first receptacle, and means for cyclically comparing said first measured signal to said predetermined signal and comparing said second measured signal to said predetermined signal and applying the resultant to control said flow metering means.

15. Apparatus for providing flow of fluent material from a source of supply to discharge continuously at a point of use or handling comprising a support, a first weighing unit mounted on said support, an intermittent receptacle suspended from said first weighing unit, means connecting said intermittent receptacle to said supply of fluent material, a second weighing unit carried by said intermittent receptacle, a continuous receptacle suspended from said second weighing unit, means defining a passage between said receptacles, a transfer valve in said passage, metering means providing controlled continuous discharge of said material from said continuous receptacle, and means for cyclically connecting said first and second measuring units to continuously control said metering means.

16. In the apparatus defined in claim 15, each of said weighing units being adapted to produce a measured signal proportional to change of weight per unit time, and means for selectively connecting one or the other of the respective signals into comparison with a preselected command signal and applying the resultant to control said metering means.

17. A system for providing and maintaining a continuous metered flow of fluent material to a point of use or other handling comprising a receptacle having a variable outlet for continuously discharging said material toward said point of use, means for refilling said receptacle from a supply source, means for continuously measuring the instantaneous rate of change in weight of material in said system caused by discharge through said outlet and means for continuously applying said measurement to said outlet for continuous control of discharge of said material from said receptacle while the receptacle is being refilled.

18. The system defined in claim 17, wherein said means for refilling the receptacle comprised another receptacle connected to be filled and refilled from the source and means for transferring material between the receptacles, and wherein said measurement and control are continuous while either of said receptacles is being refilled.

19. Apparatus for maintaining a continuous predetermined flow of fluent material to a point of handling or use comprising a first receptacle connected to receive material from a supply source, a second receptacle having a variable outlet for discharge of said material toward said point, means continuously responsive to the rate of change of weight of material in said apparatus due to discharge from said outlet for continuously controlling said discharge, means for transferring material from said first receptacle to refill said second receptacle, means for refilling said first receptacle from said source, and means for maintaining said continuous control of said discharge during refill of said receptacles.

References Cited by the Examiner

UNITED STATES PATENTS

| | | | |
|---|---|---|---|
| 3,099,368 | 7/1963 | Turner et al. | 222—58 |
| 3,107,820 | 10/1963 | Turner | 222—58 |

ROBERT B. REEVES, *Primary Examiner.*

HADD S. LANE, *Examiner.*